(12) United States Patent
Von Hess

(10) Patent No.: US 9,494,387 B2
(45) Date of Patent: Nov. 15, 2016

(54) ANTIBALLISTIC FABRIC

(71) Applicant: Absecon Mills, Inc., Cologne, NJ (US)

(72) Inventor: John Von Hess, Mays Landing, NJ (US)

(73) Assignee: Absecon Mills, Inc., Cologne, NJ (US)

( * ) Notice: Subject to any disclaimer, the term of this patent is extended or adjusted under 35 U.S.C. 154(b) by 0 days.

(21) Appl. No.: 14/318,407

(22) Filed: Jun. 27, 2014

(65) Prior Publication Data

US 2015/0323288 A1 Nov. 12, 2015

Related U.S. Application Data

(60) Provisional application No. 61/840,471, filed on Jun. 28, 2013.

(51) Int. Cl.
| | |
|---|---|
| *F41H 1/02* | (2006.01) |
| *B32B 5/02* | (2006.01) |
| *B32B 5/12* | (2006.01) |
| *B32B 5/26* | (2006.01) |
| *F41H 5/04* | (2006.01) |

(52) U.S. Cl.
CPC ............... *F41H 1/02* (2013.01); *B32B 5/024* (2013.01); *B32B 5/12* (2013.01); *B32B 5/26* (2013.01); *F41H 5/0485* (2013.01); *B32B 2250/20* (2013.01); *B32B 2262/02* (2013.01); *B32B 2307/558* (2013.01); *B32B 2571/02* (2013.01); *Y10T 442/3203* (2015.04)

(58) Field of Classification Search
CPC ....... B32B 5/022; B32B 5/024; B32B 5/026; B32B 2250/05; A41D 2500/00; A41D 2500/10; A41D 2500/20; A41D 2500/30; F41H 1/00; F41H 1/02

USPC ....... 2/2.5; 428/98, 101, 103, 105, 189, 190, 428/908.8, 920, 921; 442/35, 36, 134, 135, 442/185, 186, 239, 246, 247, 268, 269, 271, 442/327

See application file for complete search history.

(56) References Cited

U.S. PATENT DOCUMENTS

| | | |
|---|---|---|
| 4,703,631 A | 11/1987 | Naumann |
| 4,872,323 A | 10/1989 | Wunner |
| 5,137,058 A | 8/1992 | Anahara et al. |
| 5,540,260 A | 7/1996 | Mood |
| 5,788,804 A | 8/1998 | Horsting |
| 5,809,805 A | 9/1998 | Palmer et al. |
| 6,000,055 A | 12/1999 | Citterio |
| 6,276,174 B1 | 8/2001 | Wunner |
| 6,526,862 B1 | 3/2003 | Lyons |
| 6,711,919 B1 | 3/2004 | Arnold et al. |
| 6,993,939 B2 | 2/2006 | Franzke et al. |

(Continued)

FOREIGN PATENT DOCUMENTS

| | | |
|---|---|---|
| GB | WO92014876 | 12/1992 |
| WO | WO2012016046 | 2/2012 |

*Primary Examiner* — Arti Singh-Pandey
(74) *Attorney, Agent, or Firm* — Locke Lord LLP

(57) ABSTRACT

An antiballistic fabric comprises a first fabric ply made of two outer fabric layers separated by at least one inner fabric layer, each of the layers being constructed only from weft fibers laid at angles between about +30 and −30 degrees from the warp and the fibers of the outer layer form non-complementary angles with the fibers of the inner layers, the layers being knitted together in the z-direction. A second equivalent fabric ply is aligned and bound above the first fabric ply.

10 Claims, 5 Drawing Sheets

(56) References Cited

U.S. PATENT DOCUMENTS 7,533,545 B2    5/2009  Mele et al.
7,631,405 B2   12/2009  Ritter et al.
8,697,219 B2 *  4/2014  Krummel .................... 428/105
2002/0037391 A1 *  3/2002  Harpell .................... D04H 3/04
                                                    428/103
2010/0154621 A1 *  6/2010  Nilakantan .......... D03D 1/0052
                                                    89/36.02

* cited by examiner

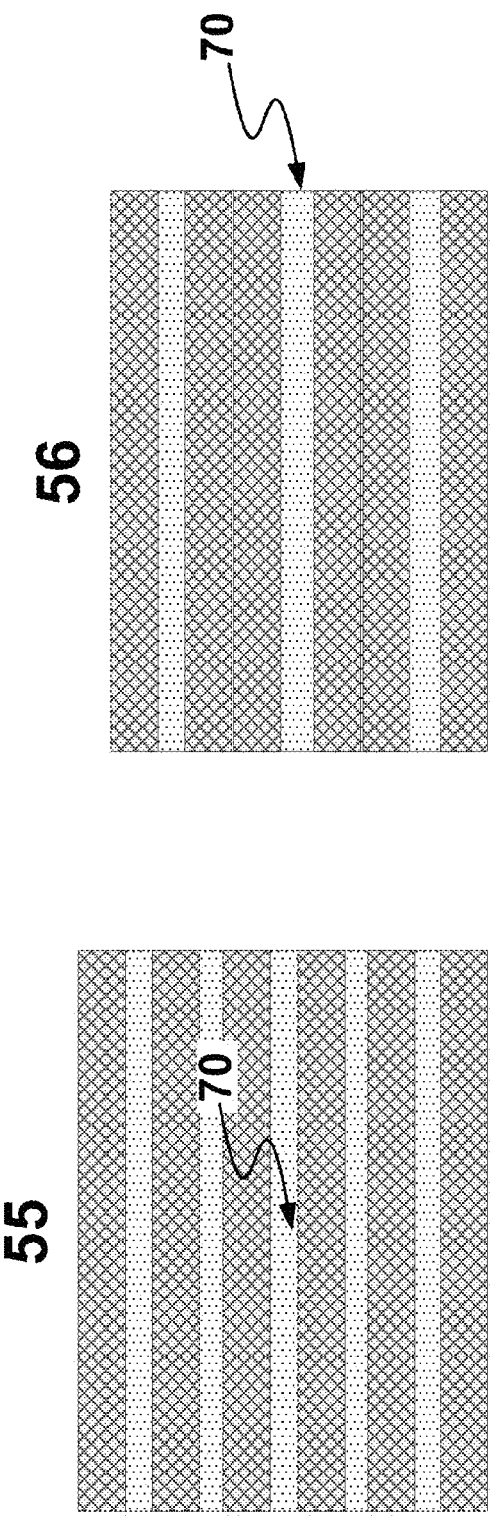

| Test ID | Multiaxial Yarns 1 | | | 2 | | | 3 | | | 4 | | | Plies Single | Plies Laminated Double | Plies Laminated Triple | Bonding | Shot Package Weight without Cover (15" by 15") Grams | Areal Density (psf) | Thickness (in) | V50 @ 0 degrees, dry, feet/s NIJ Standard | Feet per second | BFS (mm) |
|---|---|---|---|---|---|---|---|---|---|---|---|---|---|---|---|---|---|---|---|---|---|---|
| | Denier | Angle | Yarn | Denier | Angle | Yarn | Denier | Angle | Yarn | Denier | Angle | Yarn | | | | | | | | | | |
| N18 | 200 | 30 | Kevlar | 200 | 45 | Kevlar | 200 | 45 | Kevlar | 200 | 60 | Kevlar | | 10 | | VEO | 428 | 0.94 | 0.301 | IIA | 1645 | 54 |
| N33 | 600 | 30 | Kevlar KM2+ | 600 | 45 | Kevlar KM2+ | 600 | 45 | Kevlar KM2+ | 600 | 60 | Kevlar KM2+ | | 4 | 1 | VEO | 423 | 0.93 | 0.251 | IIA | 1637 | 56 |
| N37 | 600 | 30 | Kevlar KM2+ | 600 | 45 | Kevlar KM2+ | 600 | 45 | Kevlar KM2+ | 600 | 60 | Kevlar KM2+ | 11 | | | VEL | 437 | 0.96 | 0.26 | IIA | 1702 | 64 |
| N40 | 600 | 30 | Kevlar KM2+ | 600 | 45 | Kevlar KM2+ | 600 | 45 | Kevlar KM2+ | 600 | 60 | Kevlar KM2+ | | | | VEL | 434 | 0.95 | 0.251 | IIA | 1748 | 59 |
| N42 | 600 | 30 | Kevlar KM2+ | 600 | 45 | Kevlar KM2+ | 600 | 45 | Kevlar KM2+ | 600 | 60 | Kevlar KM2+ | | 5 | | VEO | 391 | 0.86 | 0.221 | IIA | 1655 | 68 |
| N44 | 400 | 30 | Kevlar LT | 400 | 45 | LT | 400 | 45 | LT | 400 | 60 | LT | 8 | | | VEL | 380 | 0.83 | 0.222 | IIA | 1618 | 59 |
| N48 | 200 | 30 | Kevlar | 200 | 45 | Kevlar | 200 | 45 | Kevlar | 200 | 60 | Kevlar | 16 | | | VEL | 388 | 0.85 | 0.216 | IIA | 1606 | 51 |
| N59 | 200 | 90 | Kevlar | 600 | 45 | Kevlar | 600 | 45 | Kevlar | 200 | 90 | Kevlar | 12 | | | VEL | 442 | 0.98 | 0.273 | IIA | 1716 | 55 |
| N66 | 200 | 90 | Kevlar | 600 | 45 | Kevlar | 600 | 45 | Kevlar | 200 | 90 | Kevlar | | 6 | | VEO | 442 | 0.98 | 0.252 | IIA | 1641 | 67 |
| N69 | 400 | 30 | Kevlar LT | 400 | 45 | LT | 400 | 45 | LT | 400 | 60 | LT | | 5 | | VEO | 450 | 0.99 | 0.245 | IIA | 1750 | 59 |
| N70 | 200 | 90 | Kevlar | 600 | 45 | Kevlar | 600 | 45 | Kevlar | 200 | 90 | Kevlar | 14 | | | VEL | 511 | 1.12 | 0.319 | IIA | 1793 | 40 |
| N71 | 600 | 30 | Kevlar KM2+ | 600 | 45 | Kevlar KM2+ | 600 | 45 | Kevlar KM2+ | 600 | 30 | Kevlar KM2+ | 13 | | | VEL | 510 | 1.12 | 0.296 | IIA | 1736 | 43 |
| N74 | 400 | 30 | Kevlar LT | 400 | 45 | LT | 400 | 45 | LT | 400 | 30 | LT | 11 | | | VEL | 522 | 1.14 | 0.305 | IIA | 1815 | 49 |
| N76 | 200 | 30 | Kevlar | 400 | 45 | Kevlar | 400 | 45 | Kevlar | 600 | 60 | Kevlar | 13 | | | VEL | 522 | 1.14 | 0.308 | IIA | 1764 | 44 |
| N77 | 600 | 30 | Kevlar KM2+ | 400 | 45 | Kevlar | 400 | 45 | Kevlar | 600 | 60 | Kevlar KM2+ | 13 | | | VEL | 509 | 1.1 | 0.269 | IIA | 1750 | 51 |
| N113 | 1000 | 30 | K129 | 1000 | 45 | K129 | 1000 | 45 | K129 | 1000 | 60 | K129 | | 4 | | VEO | 441 | 0.97 | 0.245 | IIA | 1646 | 69 |
| N115 | 750 | 30 | Twaron | 750 | 45 | Twaron | 750 | 45 | Twaron | 750 | 60 | Twaron | | 5 | | VEO | 455 | 1 | 0.327 | IIA | 1737 | 64 |
| N118 | 750 | 30 | Twaron | 750 | 45 | Twaron | 750 | 45 | Twaron | 750 | 60 | Twaron | | 5 | | VEO | 455 | 1 | 0.327 | IIA | 1470* | 33* |
| N122 | 1000 | 30 | Kevlar | 1000 | 45 | Kevlar | 1000 | 45 | Kevlar | 1000 | 45 | Kevlar | | 4 | | VEO | 465 | 1.02 | 0.255 | IIA | 1719 | 72 |
| N69 | 400 | 30 | Kevlar LT | 400 | 45 | LT | 400 | 45 | LT | 400 | 60 | LT | | 5 | | VEO | 450 | 0.99 | 0.245 | IIA | 1665 | 97 |
| N70 | 200 | 90 | Kevlar | 600 | 45 | Kevlar | 600 | 45 | Kevlar | 200 | 90 | Kevlar | 14 | | | VEL | 511 | 1.12 | 0.310 | IIA | 1614 | 62 |
| N75 | 400 | 30 | Kevlar LT | 400 | 45 | LT | 400 | 45 | LT | 400 | 60 | LT | 11 | | | VEL | 510 | 1.12 | 0.320 | IIA | 1643 | 85 |
| N76 | 200 | 30 | Kevlar | 400 | 45 | Kevlar | 400 | 45 | Kevlar | 600 | 60 | Kevlar | 13 | | | VEL | 522 | 1.14 | 0.308 | IIA | 1682 | 78 |
| N78 | 400 | 90 | Kevlar | 600 | 45 | Kevlar | 600 | 45 | Kevlar | 400 | 90 | Kevlar | 13 | | | VEL | 509 | 1.12 | 0.310 | IIA | 1663 | 71 |
| N116 | 750 | 30 | Twaron | 750 | 45 | Twaron | 750 | 45 | Twaron | 750 | 60 | Twaron | | 5 | | VEO | 445 | 0.98 | 0.319 | IIA | 1588 | 74 |
| N119 | 750 | 30 | Twaron | 750 | 45 | Twaron | 750 | 45 | Twaron | 750 | 60 | Twaron | | 5 | | VEO | 453 | 0.99 | 0.320 | IIA | 1430* | 44* |
| N192 | 750 | 30 | Twaron | 750 | 45 | Twaron | 750 | 45 | Twaron | 750 | 60 | Twaron | | 4 | | VEO | 358 | 0.79 | 0.200 | IIA | 1563 | N/A |
| N193 | 750 | 30 | Twaron | 750 | 45 | Twaron | 750 | 45 | Twaron | 750 | 60 | Twaron | | 5 | | VEO | 453 | 0.99 | 0.257 | IIA | 1713 | N/A |

\* - samples were shot at the NIJ standard velocity to assess back face signature VEL -- veil every layer
VEO -- veil every other layer

Backface-NIJ Spec

| pack# | weapon | den1st | den2nd | den3rd | den4th | #of layers | bonding | weight | a.d. | v-0 | bfd | yarn1st | yarn2nd | yarn3rd | yarn4th | clay depth | NIJ Spec |
|---|---|---|---|---|---|---|---|---|---|---|---|---|---|---|---|---|---|
| n-126 | 357mag | 1000/60 | 1000/45 | 1000/45 | 1000/30 | 7l/w400pw | nolam | 749 | 1.05 | 1418 | 35 | k | k | k | k | 5.5 | |
| HY-1 | 357sig | 1000/60 | 1000/45 | 1000/45 | 1000/30 | 5ma3mars5plyt | nolam | 886 | 1.2 | 1421 | 26.7 | h | h | h | h | 5.5 | tumbled/conditioned |
| HY-2 | 357sig | 1000/60 | 1000/45 | 1000/45 | 1000/30 | 5ma3mars5plyt | nolam | 883 | 1.2 | 1429 | 26.8 | h | h | h | h | 5.5 | tumbled/conditioned |
| HY-5 | 357sig | 1000/60 | 1000/45 | 1000/45 | 1000/30 | 5ma3mars5plyt | nolam | 883 | 1.2 | 1450 | 27.2 | h | h | h | h | 5.5 | wet |
| HY-8 | 357sig | 1000/60 | 1000/45 | 1000/45 | 1000/30 | 5ma3mars5plyt | nolam | 892 | 1.2 | 1446 | 27.5 | h | h | h | h | 5.5 | wet |
| #30 | 357sig | 1000/60 | 1000/45 | 1000/45 | 1000/30 | 5ma3mars5plyt | nolam | C-1/618 | 1.2 | 1475 | 28 | h | h | h | h | 5.5 | |
| n-324 | 357sig | 1000/60 | 1000/45 | 1000/45 | 1000/30 | 5lma/5ma/rs | nolam | 872 | 1.2 | 1454 | 30 | h | h | h | h | 5.5 | |
| n-326 | 357sig | 1000/60 | 1000/45 | 1000/45 | 1000/30 | 5lma/5ms | nolam | 872 | 1.2 | 1467 | 30 | h | h | h | h | 5.5 | |
| n-328 | 357sig | 1000/60 | 1000/45 | 1000/45 | 1000/30 | 4ma1rs2ma3rs | nolam | 869 | 1.2 | 1470 | 30 | h | h | h | h | 5.5 | |
| #29 | 357sig | 1000/60 | 1000/45 | 1000/45 | 1000/30 | 5ma3nars5plyt | nolam | C-1/616 | 1.2 | 1475 | 31.2 | h | h | h | h | 5.5 | |
| HY-4 | 44mag | 1000/60 | 1000/45 | 1000/45 | 1000/30 | 5ma3mars5plyt | nolam | 890 | 1.2 | 1318 | 32.8 | h | h | h | h | 5.5 | tumbled/conditioned |
| HY-3 | 44mag | 1000/60 | 1000/45 | 1000/45 | 1000/30 | 5ma3mars5plyt | nolam | 817 | 1.2 | 1332 | 34.6 | h | h | h | h | 5.5 | tumbled/conditioned |
| n-365 | 44mag | 1000/60 | 1000/45 | 1000/45 | 1000/30 | 6ma3mars3plyt | nolam | 817 | 1.15 | 1415 | 36 | h | hh | h | h | 5.5 | |
| HY-6 | 44mag | 1000/60 | 1000/45 | 1000/45 | 1000/30 | 5ma3nars5plyt | nolam | 884 | 1.2 | 1428 | 36.1 | h | hh | h | h | 5.5 | wet |
| HY-7 | 44mag | 1000/60 | 1000/45 | 1000/45 | 1000/30 | 5lma/5ma/rs | nolam | 884 | 1.2 | 1446 | 38.2 | h | h | h | h | 5.5 | wet |
| #33 | 44mag | 1000/60 | 1000/45 | 1000/45 | 1000/30 | 5lma/5ma/rs | nolam | C-1/590 | 1.2 | 1435 | 39.6 | h | h | h | h | 5.5 | |
| n-339 | 44mag | 1000/60 | 1000/45 | 1000/45 | 1000/30 | 5ma3mars5plyt | nolam | 865 | 1.2 | 1413 | 40.hy | h | h | h | h | 5.5 | |
| #34 | 44mag | 1000/60 | 1000/45 | 1000/45 | 1000/30 | 5ma3mars5plyt | nolam | C-1/595 | 1.2 | 1440 | 40.1 | h | h | h | h | 5.5 | |
| #32 | 44mag | 1000/60 | 1000/45 | 1000/45 | 1000/30 | 5ma3mars5plyt | nolam | C-1/591 | 1.2 | 1433 | 40.7 | h | h | h | h | 5.5 | |
| n340 | 44mag | 1000/60 | 1000/45 | 1000/45 | 1000/30 | 5lma/4hmars | nolam | 779 | 1.1 | 1415 | 45 | h | h | h | h | 5.5 | |
| n-313 | 44mag | 1000/60 | 1000/45 | 1000/45 | 1000/30 | 9l | nolam | 787 | 1.1 | 1422 | 50 | h | h | h | h | 5.5 | |

Test Packs without Lamination

| pack# | weapon | den1st | den2nd | den3rd | den4th | #of layers | bonding | weight | a.d. | v-0 | bfd | yarn1st | yarn2nd | yarn3rd | yarn4th | clay depth |
|---|---|---|---|---|---|---|---|---|---|---|---|---|---|---|---|---|
| n-310 | 9mm | 3000/60 | 3000/45 | 3000/45 | 3000/30 | 3layers | no lam | 456 | 0.64 | 1178 | 48 | h | h | h | h | 5.5 |
| n-314 | 9mm | 1000/60 | 1000/45 | 1000/45 | 1000/30 | 6layers | no lam | 535 | 0.75 | 1266 | 56 | h | h | h | h | 5.5 |
| n-308 | 9mm | 3000/60 | 3000/45 | 3000/45 | 3000/30 | 4layers | no lam | 599 | 0.84 | 1368 | 44 | h | h | h | h | 5.5 |
| n-304 | 9mm | 3000/60 | 3000/45 | 3000/45 | 3000/30 | 4layers | no lam | 614 | 0.86 | 1368 | 40 | h | h | h | h | 5.5 |
| n-209 | 357sig | 1000/60 | 1000/45 | 1000/45 | 1000/30 | 2lk3spec | no lam | 657 | 0.92 | 1597 | 44 | k/s | k/s | k/s | k/s | 5.5 |
| n-325 | 357sig | 0 | 0.1000/45 | 1000/45 | 1000/30 | 0.10ma/rs | no lam | 862 | 1.2 | 1679 | 41 | h | h | h | h | 5.5 |
| n-302 | 357sig | 3000/60 | 3000/45 | 3000/45 | 3000/30 | 6layers | no lam | 904 | 1.27 | 1733 | 42 | h | h | h | h | 5.5 |
| n-327 | 357sig | 1000/60 | 1000/45 | 1000/45 | 1000/30 | 4ma/1rs/2ma/3rs | no lam | 860 | 1.2 | 1747 | 43 | h | h | h | h | 5.5 |
| n-311 | 357sig | 1000/60 | 1000/45 | 1000/45 | 1000/30 | 9layers | no lam | 781 | 1.1 | 1748 | 56 | h | h | h | h | 5.5 |
| n-323 | 357sig | 1000/60 | 1000/45 | 1000/45 | 1000/30 | 5ma/5mars | no lam | 868 | 1.2 | 1753 | 52 | h | h | h | h | 5.5 |
| n-346 | 44mag | 1000/60 | 1000/45 | 1000/45 | 1000/30 | 5na/4mars | no lam | 785 | 1.1 | 1585 | 69 | h | h | h | h | 5.5 |
| n-312 | 44mag | 1000/60 | 1000/45 | 1000/45 | 1000/30 | 9layers | no lam | 774 | 1.1 | 1605 | 67 | h | h | h | h | 5.5 |
| n-210 | 44mag | 1000/60 | 1000/45 | 1000/45 | 1000/30 | 2lk3spec | no lam | 610 | 0.86 | 1614 | 74 | k/s | k/s | k/s | k/s | 5.5 | mars = multi-axial w/ woven fabric in between layers wet = Submersed in water for 30 minutes, then drip dried for 10 minutes, then shot tumbled/conditioned = Tumbled in a drum at 5 rpm +/- 1 rpm for 72,000 rotations +/- 1,500 rotations for 10 days +/- 1 hour, then shot

ANTIBALLISTIC FABRIC

RELATED PATENT APPLICATIONS

This application claims the benefit of priority of U.S. Provisional Patent Application Ser. No. 61/840,471, filed Jun. 28, 2013, the disclosures of which being incorporated herein by reference in their entirety.

FIELD OF THE INVENTION

The present invention relates to fabric manufactures, such as soft and hard body armor, vests, life protective systems, and anti-ballistic systems which may adorn individuals or constructs so as to resist oncoming projectiles.

BACKGROUND OF THE RELATED ART

Without adequate protection, individuals exposed to contact from incoming objects in the form of bullets, shrapnel, or other high-velocity projectiles stand to be injured, permanently incapacitated, or killed. The art has since provided many forms of protection to such individuals in the way of protective coatings, body armor, and other forms of anti-ballistic wear.

Protective coatings and body armor, for example, are subjected to testing to determine their effectiveness in withstanding projectile penetration. An exemplary form of tests are those which identify antiballistic performance according to standards, for example, those of the National Institute of Justice (NIJ). Testing conducted pursuant to NIJ standards identify speeds of projectiles that achieve penetration of the sample, backface deformation, and other performance characteristics.

According to NIJ Standard 0101.06, body armor may be classified into six specific types, based on the level of ballistic protection performance. The first four of these armor levels, Types I, II-A, II, and III-A, protect against handgun threats and are typically soft armor protective vests worn on a regular basis. Types III and IV, on the other hand, are typically hard armor that protects against the highest threats. For each of the threat levels, the armor must not only defeat a specified projectile type and number of shots, but also must limit a depth of deformation (backface deformation, backface signature, of "Bfs") in a clay backing behind the armor to 44 mm or less.

The NIJ Type II-A provides protection, for example, against a 9 mm full metal jacketed bullet impacting at 1225 feet/second and a 0.40 S&W full metal jacketed bulled impacting at 1155 feet/second. The NIJ Type II standard provides protection, for example, against a 357 Magnum impacting at 1430 feet/second, and a 9 mm full metal jacketed bullet impacting at 1305 feet/second. The NIJ Type III-A armor standard requires the highest protection level for handgun threats. It provides protection, for example, against 44 Magnum lead semi-jacketed hollow point bullets, impacting at a velocity of 1430 feet/second or less, and 357 Magnum impacting at a velocity of 1470 feet/second or less. An armor satisfying the Type III-A standard also provides protection against the lesser threat levels, Type I, Type II-A, and Type II.

NIJ Types III and IV are for high-powered ball and armor piercing projectiles, respectively, and are typically used during tactical operations where higher protection is required. Type III armor protects against 7.62 mm full metal jacketed bullets (U.S. military designation M80) impacting at a velocity of 2780 feet/second or less, while providing protection against the lesser NIJ armor level threats. Type IV armor protects against 30 caliber armor piercing rounds impacting at velocity of 2880 feet/second.

It is known to create ballistic resistant garments made from woven fabric. Woven fabric armors may be more flexible, concealable, and wearable than the vests using reinforced plastic. Woven vests may be characterized by their weight per unit area (areal density). For example, aramid fabrics that meet NIJ Level III-A requirements have been designed with areal densities on the order of 1.2 pound per square foot. While satisfactory to meet the NIJ standards, these large areal densities are not suitable because of their heavy weight.

Therefore, there is a need to provide an antiballistic fabric that can achieve adequate protection against projectiles while maintaining low areal density, comfort, and flexibility for the individual form whom it is designed.

SUMMARY

An antiballistic fabric may be comprised of at least two fabric layers bound atop one another, each comprised of two outer fabric layers separated by at least one inner fabric layer. The two outer fabric layers and the at least one inner fabric layer are constructed only from weft fibers oriented at angles between about +30 and −30 degrees from the warp. The angle of the weft fibers of at least one of the two outer fabric layers does not form a complementary angle with the weft fibers of at least one of the inner fabric layers. The layers of the fabric layers are knitted together in the z-direction.

The antiballistic fabric may further comprise an intermediary layer between the first and a second fabric plies that may be a resin, polymer, thermoplastic, or thermoset. For example, the intermediary layer may be a polymer veil.

The antiballistic fabric may comprised of a plurality of fabric layers equivalent to one of the first and a second fabric plies disposed and aligned between the first and a second fabric plies.

The fabric layers of the antiballistic fabric may be comprised of four fabric layers of which an upper layer, an upper-intermediate layer, a bottom-intermediate layer, and a bottom layer, are angled at +60 degrees from the warp, −45 degrees from the warp, +45 degrees from the warp, and −30 degrees from the warp, respectively.

The fabric layers of the antiballistic fabric may be oriented atop one another at an angle such that the lower-most outer fabric layer of one fabric layer is rotated at an angle to the upper-most outer fabric layer of another fabric layer at an angle selected from the group consisting of +60 degrees, +30 degrees, −30 degrees, and −60 degrees.

DESCRIPTION OF THE DRAWINGS

FIG. 4 illustrates an exemplary stacking arrangement of multiple antiballistic fabrics.

FIG. 5 is a collection of test results for exemplary embodiments of antiballistic fabric.

FIG. 6 is a collection of test results for exemplary embodiments of antiballistic fabric that use woven fabric, not polymer, as an intermediate between exemplary plies.

In the drawings like characters of reference indicate corresponding parts in the different figures.

DETAILED DESCRIPTION

Figure 1:
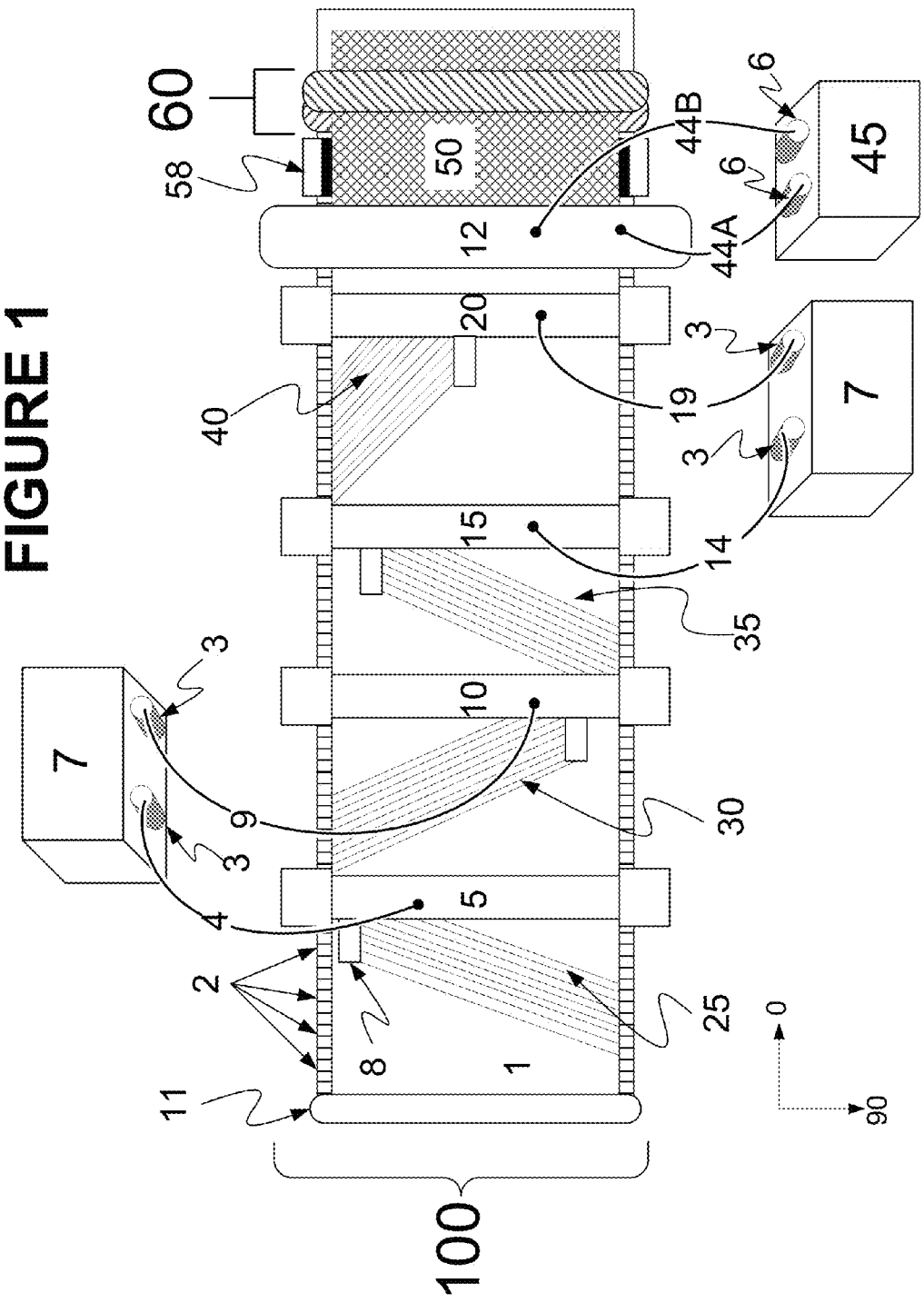
FIG. 1 illustrates an exemplary topographic view of an exemplary multi-axial knitting machine.

According to the illustrative embodiment of FIG. 1, an exemplary fiber laying apparatus 100 may take the form of any type of multi-axial weaving machinery to manufacture anti-ballistic fabric from any one or more desirable fibers known to those skilled in the art.

Exemplary types of fibers suitable for use may be, for example, aramid fibers (such as those manufactured by E. I. du Pont de Nemours and Company, of Wilmington, Del. under the trade name KEVLAR®, by Teijin Aramid B.V. of the Netherlands under the trade name TWARON®, by Hyosong of Seoul, Korea, or by Teijin Techno Products Limited, of Japan under the trade name TECHNORA®); para-aramid fibers such as poly (p-phenylene terephthalamide) (PPD-T) L poly-phenylene benzobizoxazole (PBO) fibers (such as those manufactured by Toyobo Co. Ltd. of Japan under the trade name ZYLON®); high molecular weight polyethylene fibers (such as those manufactured by Allied Signal, Inc. of Morristown, N.J. under the trade name SPECTRA SHIELD™); ultra heavy molecular weight poly ethylene (UHMWPE) fibers (such as those manufactured by Honeywell International of Morristown, N.J. under the trade name SPECTRA® and manufactured by DSM High Performance Fibers B.V. of the Netherlands under the trade name DYNEEMA®); poly{2,6-diimidazo[4,5-b:4',5'-e]-pyridinylene-1,4(2,5-dihydroxy)phenylene} (PIPD) fibers (such as those manufactured by Magellan Systems International, LLC of Bethesda, Md. under the trade name MSC); aromatic polyester fibers (such as the type manufactured by Kuraray Co. Ltd. of Japan under the trade name VECTRAN®); and ceramic fibers (such as the those manufactured by 3M Ceramic Fiber Products under the trade name NEXTEL®). Other suitable fibers may also be used based on desirable high stiffness and high strength-to-weight ratios.

Exemplary machines capable of weaving warp and weft layers at desired angles may be of the kind described in U.S. Pat. Nos. 4,703,631, 4,872,323, 5,788,804, 5,809,805, 6,000,055, 6,276,174, 6,711,919, 6,993,939, and 7,533,545, U.S. Patent Application Publication US2010/0154621, the disclosures of each of which are incorporated by reference into this application in their entirety. Companies which market and manufacture suitable exemplary machines 10 may include, for example, Liba Maschinenfabrik GmbH and Karl Mayer Textilmaschinenfabrik. A suitable machine 100 may also lay fabrics in numerous patterns and intervals.

In one exemplary embodiment, machine 100 may incorporate multiple weft insertion carriages which may be computer operated and controlled to lay fabric in the weft at angles less than 90 degrees to the warp layer, such as, for example, between about −30 degrees and about +30 degrees.

In a preferred embodiment, an exemplary machine 100 may be a Copcentra Max 3 CNC manufactured by Liba Maschinenfabrik GmbH of Naila Germany.

Post-treatment of fabrics made using an exemplary machine 100 may be accomplished through use intermingling resins, polymers, thermoplastics, or thermosetting materials within the variable angled weft insertions to increase the bonding between the adjacent layers of fabric.

It is also known to coat the outer surfaces of fibers with such products, such as polyolefins, polyvinyl alcohol (PVA) and PVA derivatives, polyamides, polyfluoro-carbons, silicones, glycols, ethylene co-polypropylene, polyacrylates, polyesters, polyacrylics, epoxies, phenolics and rubbers. Application of heat, calendaring, lamination, or combinations of the aforementioned treatments following intermixing of previously described products with the fabric layers may increase rigidity and may provide additional antiballistic strength.

Returning to the illustrative embodiment of FIG. 1, an exemplary fiber laying machine 100 may comprise a belt 1 disposed between parallel, motive chain-rows of transport needles 2 that are operably connected to conveyor 11 to displace fiber layers that are laid atop the belt 1 surface and anchored about one or more needles 2. Fibers are anchored about needles 2 by weft stations 5, 10, 15, and 20 while being moved downstream towards knitting station 12 where the final fabric 50 formed from the layering of the weft stations is collected about rollers 60 for further use. An exemplary row of transport needles 2 may comprise a motive chain of needles separated from adjacent needles on the chain in defined intervals, such as 0.10 inches to an inch, preferably 0.10 inch.

According to the illustrative embodiment, each weft station 5, 10, 15, and 20 may traverse the surface of belt 1 while operatively enabling the transverse displacement of a shog 8. According to this exemplary operation, a weft station may move up and down belt 1 while moving shog 8 perpendicularly to belt 1 and thereby lay fibers at varying angles across the belt surface in the weft. In another exemplary embodiment, each weft station 5, 10, 15, 20 may have a maximum lateral displacement about belt 1 so as to provide adequate distance to lay fiber at a desired angle. In yet another exemplary embodiment, more than four weft stations may be utilized depending on the size of belt 1 and desired amount of weft fibers to be laid. In a preferred embodiment, machine 100 may be extended to have up to six weft stations suitably placed to achieve any of the embodiments disclosed. Those skilled in the art may incorporate additional weft stations as necessary to achieve additional advantages using the embodiments disclosed herein.

In a preferred embodiment, the weft stations may be spaced apart depending on the insertion width. The insertion width is contingent on the denier yarn in use and the desired angle from the warp.

An exemplary machine 100 receives fiber from one or more fiber sources 7, which in a preferred embodiment may be creels 3 disposed on or within a creel station. An exemplary fiber source 7 may be situated in any suitable location either on or adjacent to machine 100 to properly supply fabric thereto. According to an illustrative embodiment, fibers 4, 9, 14, and 19 may be provided to weft stations 5, 10, 15, and 20, respectively, from creels 3 of fiber sources 7. While being supplied with the fiber from the fiber source, an exemplary weft station 5/10/15/20 and its corresponding shog 8 may be moved to anchor fiber about transport needles 2 on the periphery of belt 1 and lay the anchored fibers across the belt to the opposite row of transport needles 2 to create a weft layer of fibers at a particular fiber angle. In operation, each weft fiber layer produced by weft station 25 may be overlapped by a weft fiber layer produced by weft station 30, the combination of which may be overlapped by a weft fiber layer produced by weft station 35, and the prior overlapping layers being further overlapped by a weft fiber layer produced by weft station 40. As the layers exit machine 100 from the knitting system, they are detached from their mooring about one or more transport needles 2 by fabric edge cutters 58, which may be located in bays adjacent the transport needles 2.

According to a preferred embodiment, machine 100 may create an antiballistic fabric 50 using combination of overlapped layers produced by a first weft fiber layer 25 that is angled at about −30 degrees from the warp, a second weft fiber layer 30 that is angled at about +45 degrees from the warp, a third weft fiber layer 35 that is angled at about −45 degrees from the warp, and a fourth weft fiber layer 40 that is angled at about +60 degrees from the warp.

An exemplary knitting station 12 may be used to insert fibers through the overlapping weft layers formed upstream from the weft insertion stations. An exemplary knitting station 12 may incorporate z-stitching, tricot stitching, chain stitching, quilting, knitting, needle felting, needling, or needle-punching or other three-dimensional weaving techniques known to those skilled in the art to enhance the fiber-to-fiber interaction of the laid fabrics for anti-ballistic purposes. Examples of z-stitching or chain stitching may be found in U.S. Pat. Nos. 6,526,862, 7,631,405, 5,540,260, 5,137,058, and International Patent Application Publication Numbers WO92/14876, WO12/16046, the disclosures of each of which are incorporated by reference into this application in their entirety.

In a preferred embodiment, antiballistic fabric 50 may be formed from overlapping layers of weft fabric at about +60 degrees, about −45 degrees, about +45 degrees, and about −30 degrees, each from the warp, that may be chain stitched and z-stitched within knitting station 12 using fabric 44A and 44B from fabric source 45. Fabric source 45 may be a similar fabric supply apparatus to that used as fabric source 7 and have similar or alternatively configured creels 6. Alternatively fabric source 45 may be a series of guide bars and rollers feeding fabric 44A and 44B to knitting station 12.

In an exemplary antiballistic fabric 50, the weft fabric layers are inserted across belt 1 of machine 100 so that between the top and the immediately preceding intermediary layer and the bottom and its immediately preceding intermediary layer there are no complementary angles.

Figure 2:
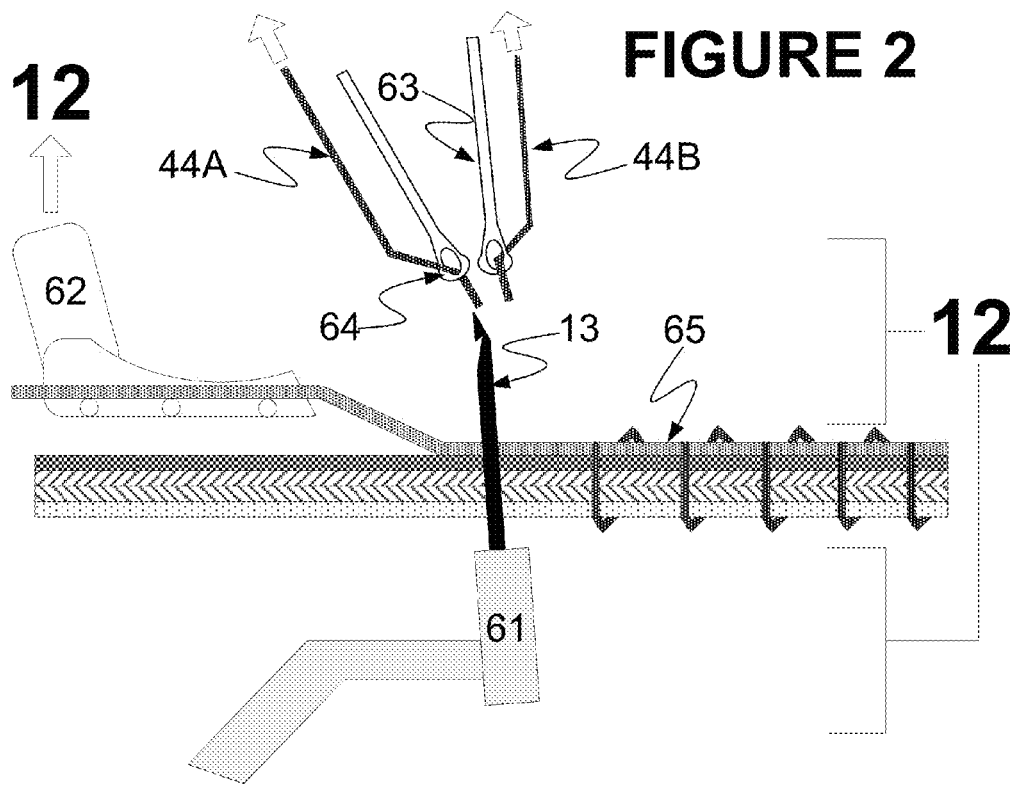
FIG. 2 illustrates a profile view of an exemplary knitting system for an exemplary multi-axial knitting.

FIG. 2 is an illustrative embodiment of a portion of a knitting station 12 comprising a plurality of compound needles 13 attached to a sinker arm apparatus 61. In operation, the sinker arm apparatus 61 moves the needle 13 into the fabric layers that are a result of the fiber laying configuration of the weft stations. As needle 13 is passed through the fabric layers, it is brought into contact with knitting fabrics 44A and 44B supplied via guides 64 and 63, respectively. In an exemplary embodiment, knitting fabric 44A may be used for z-stitching the fabric layers. In an alternative exemplary embodiment, knitting fabric 44B may be used for chain stitching the fabric layers. Threading sinker apparatus 62 may also be provided to supply a warp thread atop the weft layers that may also be knitted to the same via the combined operation of knitting fabric 44A and/or 44B, sinker arm 61, and needle 13. By retracting needle 13 back through the fabric layers, sinker arm 61 also causes knitting fabric 44A or 44B to be passed through the fabric layers as it is held by needle 13. Repetition of the aforementioned sequence may form z-stitches in the fabric layers creating a three-dimensional fabric matrix, which may be seen with reference to FIG. 3. In addition, according to an exemplary embodiment, repetition of the aforementioned sequence may also provide chain stitching in conjunction with z-stitching to further enhance the three-dimensional fabric matrix, which may also be seen with reference to FIG. 3.

Figure 3:
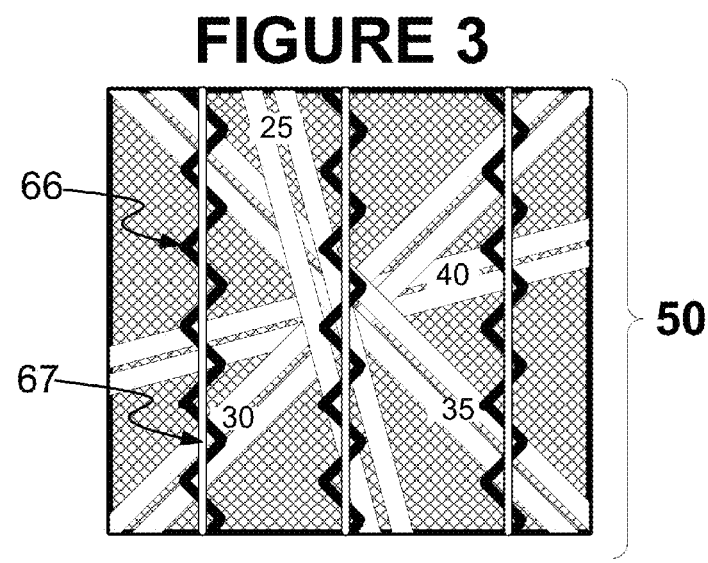
FIG. 3 illustrates an exemplary cross section of an antiballistic fabric.

According to the illustrative embodiment of FIG. 3, an exemplary antiballistic fabric ply 50 may be comprised of at least four layers of weft-laid fabric 25, 30, 35, and 40. The layers of weft-laid fabric may be held in the z-direction by knitting fibers 44A or the combination of knitting fibers 44A and 44B.

An exemplary antiballistic fabric may be comprised of a plurality of fabric plies 50 stacked one on top of the other so that the upper-most fabric layer of one is in contact with the bottom-most fabric layer of another. These plies may be held together by perimeter stitching, quilting, or other known techniques.

With reference to the illustrative embodiment of FIG. 4, the plies 50 may be separated from one another by intermediary layers 70 such as polymers, additional woven or non-woven fabrics, and other materials to increase bonding, rigidity, flexibility, or a combination of such parameters.

In another exemplary embodiment according to FIG. 4, intermediary layers may be resins, polymers, thermoplastics, thermosets, woven fabrics, non-woven fabrics, rubber, and stainless steel or other metallic strands. In another preferred embodiment, a polymer veil may be inserted between each of the fabric layers or may be inserted every other fabric layer to promote further bonding, rigidity, or reduction in back face signature. An exemplary polymer veil is known to those skilled in the art, but may preferably be Spungefab of Cuyahoga Falls, Ohio.

In another exemplary embodiment according to FIG. 4, six fabric plies may be made up of four layers of 200-3000 denier aramid fibers laid across the weft at −30, +45, −45, +60, in that order from bottom to top, and chain stitched with z-fibers. These fabric layers may be stacked so that the −30 degree layer of fibers goes on top of the +60 degree layer of fibers of the previous layer. Further, the six fabric plies may have polymer veil disposed between each fabric ply or in different arrangements, such as every other fabric ply. The final combination of fabric plies and veil may be heated and calendared and then prepared for use as an antiballistic fabric.

Testing of the multiaxial antiballistic fabric was conducted once at Chesapeake Testing of Belcamp, Md. and again at United States Ballistic Engineering of Rising Sun, Md 21911 in accordance with NIJ-STD-0101.06. Results of the testing are tabulated in FIG. 5.

As shown in FIG. 5, testing of samples having varying denier sizes, fiber type, angles, and arrangement were conducted at two different facilities according to NU-STD-0101.06. Fabric plies were arranged as either single plies, sets of two plies ("double" in FIG. 5), and sets of three plies ("triple"). As illustrated in FIG. 5, "VEL" indicates use of polymer veil after every fabric ply and "VEO" indicates use of polymer veil after every two fabric plies. As noted, testing of samples N-118 and N-119 were conducted using projectiles fired at the NIJ IIA and NIJ IIIA standard speeds, respectively, to obtain actual backface deformation for sample.

With reference to FIG. 5, the testing embodiments noted by Test ID numbers N-40, N-42, N-59, N-115, N-69, N-70, N-74, and N-113 were compared to test results of use of DuPont XP™ fabrics published by E. I. du Pont de Nemours and Company, of Wilmington, Del. The comparison between the samples and DuPont XP™ are shown in Table 1:

TABLE 1

| Design | NIJ Standard | Bullet Type | Areal Density | V-50 (ft/s) | NIJ Recommended V-50 (ft/s) |
|---|---|---|---|---|---|
| Test ID number N-42 | IIA, II | 9 mm | 0.85 | 1655 | 1225/1305 |
| DuPont XP ™ 11 layers of XP 300 with Trauma | | | 0.89 | 1536 | |
| Test ID number N-40 | IIA, II | 9 mm | 0.95 | 1748 | 1225/1305 |
| DuPont XP ™ 7 layers of XP 300 with Trauma and 9 layers of 1000dn K129 | | | 0.97 | 1625 | |
| Test ID number N-59 | IIA, II | 9 mm | 0.98 | 1716 | 1225/1305 |
| DuPont XP ™ 19 layers of 100dn K129 | | | 0.98 | 1533 | |
| Test ID number N-115 | II | 357 Mag | 1.00 | 1737 | 1225/1305 |
| DuPont XP ™ 10 layers of S102 with foam | IIA, II | 9 mm | 1.04 | 1690 | |
| Test ID number N-69 | IIIA | 357 Sig | 0.99 | 1750 | 1470 |
| DuPont XP ™ 11 layers S102 | IIA, II | 9 mm | 1.12 | 1713 | 1225/1305 |
| Test ID number N-113 | II | 357 Mag | 0.97 | 1646 | 1430 |
| DuPont XP ™ 9 layers S102 with foam | | | 0.94 | 1635 | |
| Test ID number N-69 | IIIA | 44 Mag | 0.99 | 1665 | 1430 |
| DuPont XP ™ 10 layers S102 with 3 mm foam | | | 1.04 | 1677 | |
| Test ID number N-115 | IIIA | 44 Mag | 0.98 | 1588 | 1430 |
| DuPont XP ™ 5 layers S102 with 7 layers 600 × 300 and 3 layers S102 | | | 1.05 | 1693 | |
| Test ID number N-70 | IIIA | 357 Sig | 1.12 | 1793 | 1430 |
| DuPont XP ™ | | | N/A | N/A | |
| Test ID number N-74 | IIIA | 357 Sig | 1.14 | 1815 | 1430 |
| DuPont XP ™ | | | N/A | N/A | |

As shown in FIG. 5 and Table 1, the performance of embodiments of exemplary antiballistic fabrics illustrated and described with respect to FIGS. 1 through 4 show substantially high V-50 values at relatively low areal densities and BFS values. For example, embodiments of antiballistic fabric made in accordance with the disclosures herein have been shown to achieve V-50 values that were between 5 and 20% higher than those required under applicable NIJ standards while having areal densities below 1.0. For those samples whose areal densities were between 1.0 and 1.2, the exemplary antiballistic fabrics were able to achieve V-50 values that were between 22 and 40% higher than those required under applicable NIJ standards.

With reference to FIG. 6, the performance of other embodiments of exemplary antiballistic fabrics illustrated and described with respect to FIGS. 1 through 4 have been conducted in which woven fabric has been used between the plies and no polymer has been used between the plies. The tests of these exemplary embodiments of multiaxial antiballistic fabric were conducted at Chesapeake Testing of Belcamp, Md. and again at United States Ballistic Engineering of Rising Sun, Md 21911 in accordance with NIJ-STD-0101.06.

As disclosed above and with continued reference to FIG. 6, intermediary layers of woven fabric, such as a variegated structure woven in the fabric and adapted to control a parameter of the textile construction (the parameter may be strength, breathability, and/or other properties) that is manufactured by Absecon Mills, Inc. of Cologne, N.J., have been used between the plies, although other woven fabrics known to those skilled in the art may be used as well. Using knitting techniques previously disclosed, an exemplary antiballistic fabric of the type made without polymer between the plies and tested as shown in FIG. 6 provides increased flexibility, reduced cost, reduced weight, improved back face signature for an exemplary antiballistic fabric manufactured in such fashion.

It is to be understood that the above description is intended to be illustrative, and not restrictive. Many other embodiments will be apparent to those of skill in the art upon reviewing the above description and interrelated disclosures of the various disclosed embodiments and figures. Indeed, those skilled in the art will recognize, or be able to ascertain using no more than routine experimentation, many equivalents to the specific embodiments described. Such equivalents are intended to be encompassed by the following claims. The scope of the invention should, therefore, be determined with reference to the appended claims, along with the full scope of equivalents to which such claims are entitled.

The invention claimed is:

1. An antiballistic fabric, comprising:
   a first fabric ply comprised of two outer layers separated by at least one inner layer, wherein at least one of the two outer layers and the at least one inner layer are constructed only from weft fibers laid at angles between about +30 and −30 degrees from the warp, the angle of the weft fibers of at least one of the two outer fabric layers being not complementary to the angle of the weft fibers of the at least one inner fabric layer, the two outer fabric layers and the at least one inner fabric layer being knitted together in the z-direction; and
   a second fabric ply comprised of two outer fabric layers separated by at least one inner fabric layer, wherein at least one of the two outer fabric layers and the at least one inner fabric layer are constructed only from weft fibers laid at angles between about +30 and −30 degrees from the warp, the angle of the weft fibers of at least one of the two outer fabric layers being not complementary to the angle of the weft fibers of the at least one inner fabric layer, the two outer fabric layers and the at least one inner fabric layer being knitted together in the z-direction, wherein the lower-most outer fabric layer of the second fabric ply is aligned above the upper-most fabric layer of the first fabric ply, the first fabric ply and the second fabric ply being connected together.

2. The antiballistic fabric of claim 1, further comprising a plurality of fabric layers equivalent to one of the first fabric ply and the second fabric ply disposed between the first fabric ply and the second fabric ply.

3. The antiballistic fabric of claim 2, wherein the first fabric ply is comprised of four fabric layers.

4. The antiballistic fabric of claim 3, wherein the second fabric ply is comprised of four fabric layers.

5. The antiballistic fabric of claim 4, wherein the first fabric ply is comprised of an upper layer, an upper-intermediate layer, a bottom-intermediate layer, and a bottom layer, the upper layer, upper-intermediate layer, bottom-intermediate layer, and bottom layer being angled at +60 degrees from the warp, −45 degrees from the warp, +45 degrees from the warp, and −30 degrees from the warp, respectively.

6. The antiballistic fabric of claim 4, wherein the second fabric ply is comprised of an upper layer, an upper-intermediate layer, a bottom-intermediate layer, and a bottom layer, the upper layer, upper-intermediate layer, bottom-intermediate layer, and bottom layer being angled at +60 degrees from the warp, −45 degrees from the warp, +45 degrees from the warp, and −30 degrees from the warp, respectively.

7. The antiballistic fabric of claim 4, wherein each of the plurality of fabric layers is comprised of an upper layer, an upper-intermediate layer, a bottom-intermediate layer, and a bottom layer, the upper layer, upper-intermediate layer, bottom-intermediate layer, and bottom layer being angled at +60 degrees from the warp, −45 degrees from the warp, +45 degrees from the warp, and −30 degrees from the warp, respectively.

8. The antiballistic fabric of claim 2, further comprising an additional woven fabric intermediary layer on one of the plurality of fabric layers.

9. The antiballistic fabric of claim 1, wherein the areal density is less than about 1.2.

10. The antiballistic fabric of claim 9, wherein the V-50 is between about 1600 and about 1750 feet per second.

* * * * *